United States Patent [19]

Burnham

[11] Patent Number: 5,273,331
[45] Date of Patent: Dec. 28, 1993

[54] POST HOLE DIGGER

[76] Inventor: Francis L. Burnham, 1830 Five Chop Rd., Orangeburg, S.C. 29115

[21] Appl. No.: 55,183

[22] Filed: Apr. 30, 1993

[51] Int. Cl.$^5$ .................................. A01B 1/18
[52] U.S. Cl. ................................ 294/50.8; 294/57
[58] Field of Search ................. 294/50.5–50.9, 294/53.5, 55, 57, 68.23, 115; 111/92, 101, 106

[56] References Cited

U.S. PATENT DOCUMENTS

| Des. 311,853 | 11/1990 | Stormsgaard | D8/5 |
|---|---|---|---|
| 110,211 | 12/1870 | Davis | 294/50.5 |
| 281,193 | 7/1883 | Kohler | 294/50.9 |
| 333,452 | 12/1885 | Disston | 294/50.8 |
| 902,070 | 10/1908 | Gooch | 294/50.8 X |
| 1,187,316 | 6/1916 | Higby | 294/50.8 |
| 1,212,303 | 1/1917 | Wilt | 294/50.8 X |
| 1,706,332 | 3/1929 | Theriot | 294/50.8 |
| 1,888,929 | 11/1932 | McDowell | 294/50.8 |
| 2,028,680 | 1/1936 | Mayeda et al. | 294/50.8 |
| 2,216,383 | 10/1940 | Brandon | 294/68.23 X |
| 2,230,498 | 2/1941 | Loos et al. | 294/50.8 |
| 2,435,473 | 2/1948 | Sonnenberg | 294/50.8 |
| 2,654,626 | 10/1953 | Rice | 294/50.8 |
| 2,703,251 | 3/1955 | Green | 294/50.9 |
| 2,710,765 | 6/1955 | Arens | 294/50.6 |
| 2,712,467 | 7/1955 | Rice | 294/50.8 |
| 2,987,836 | 6/1961 | Carlbom | 294/50.8 X |
| 3,042,442 | 7/1962 | Weil et al. | 294/50.8 |
| 4,042,270 | 8/1977 | Weiland | 294/50.8 |
| 4,694,760 | 9/1987 | Camp | 294/50.8 X |
| 4,961,471 | 10/1990 | Ovens | 175/170 |
| 4,986,373 | 1/1991 | Charland et al. | 175/21 |

FOREIGN PATENT DOCUMENTS

| 129603 | 4/1902 | Fed. Rep. of Germany | 294/50.8 |
|---|---|---|---|
| 526911 | 6/1931 | Fed. Rep. of Germany | 294/50.5 |
| 610424 | 10/1948 | United Kingdom | 294/50.5 |
| 739454 | 10/1955 | United Kingdom | 294/53.5 |

Primary Examiner—Johnny D. Cherry
Attorney, Agent, or Firm—Michael A. Mann; Maria Reichmanis

[57] ABSTRACT

A post hole digger having a bracket plate, a center shaft and two side shafts, each shaft with a first end and a second end. The first end of the center shaft is mounted to the bracket plate. A pair of digging blades are pivotally attached to the second end of the center shaft, with a blade pivotally attached to the second end of each side shaft. A handle is pivotally attached to the bracket plate and to the first end of each side shaft. As the handles are rotated with respect to one another, the side shafts move axially with respect to the center shaft to open and close the digging blades. The shafts are held approximately parallel and in spaced relation to one another during operation of the digger so that the hole has an approximately constant diameter. A detent mechanism is provided for indicating when the digging blades are oriented approximately parallel to one another for insertion into the ground. Extension rods increase the operating length of the shafts to allow digging deeper holes.

19 Claims, 2 Drawing Sheets

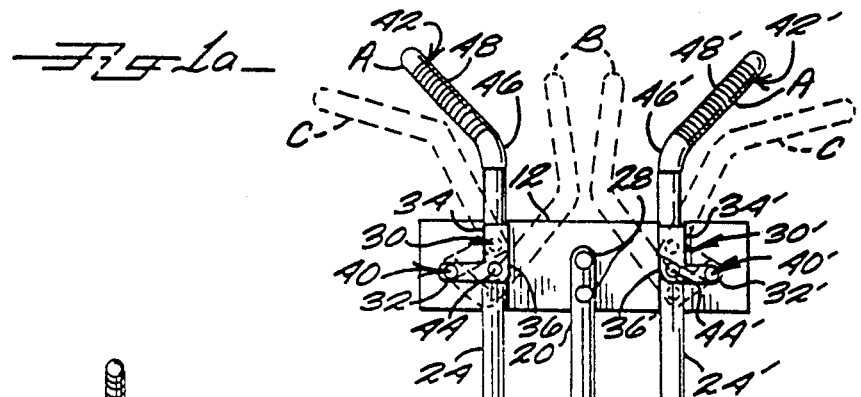
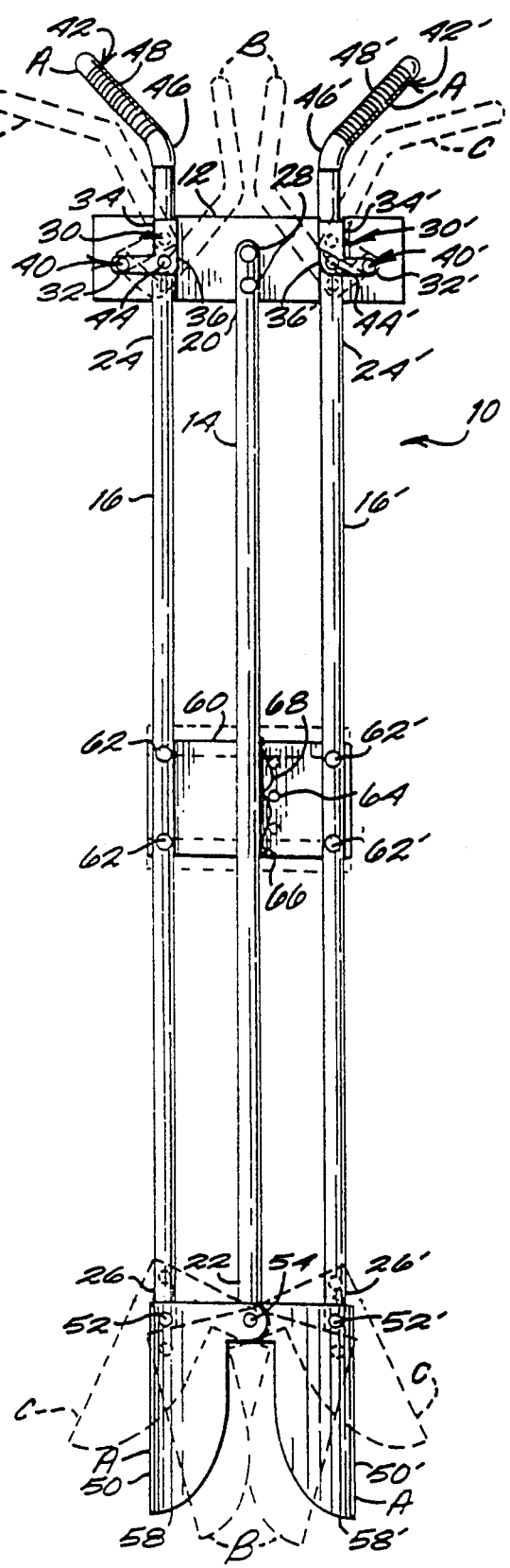
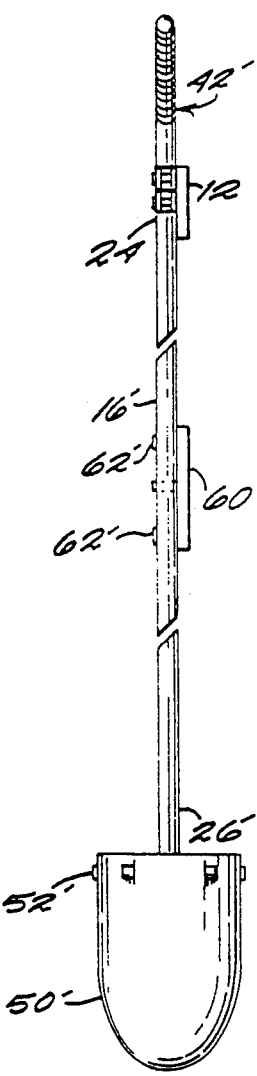
Fig. 1a
Fig. 1b

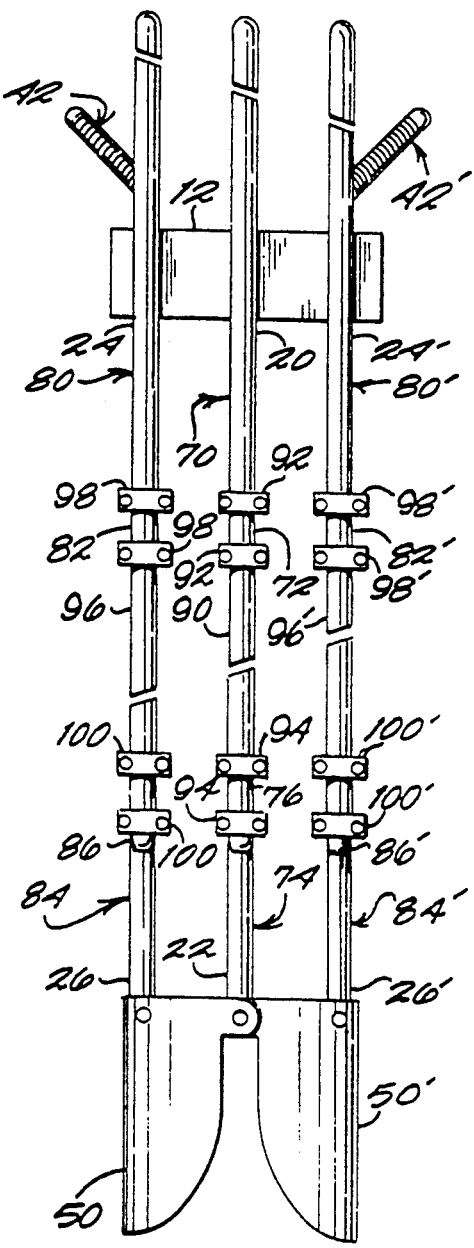
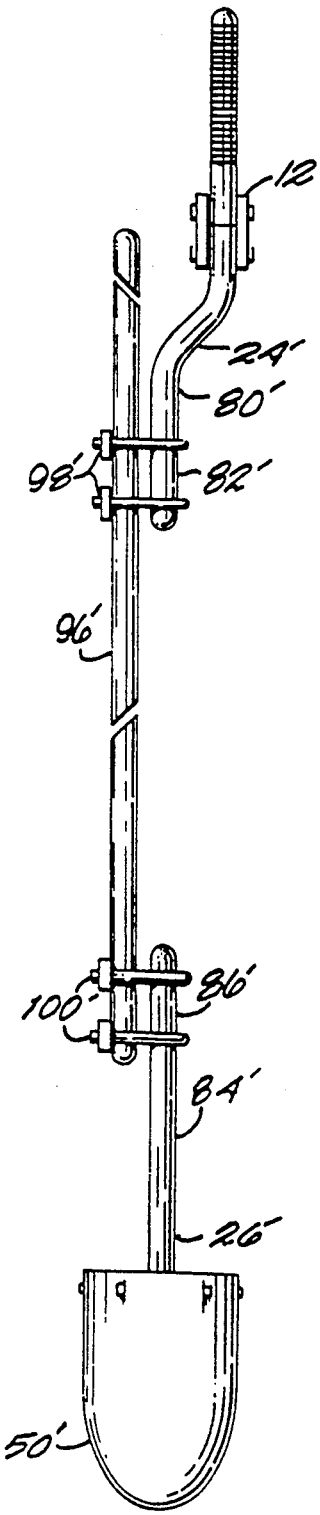

POST HOLE DIGGER

BACKGROUND OF THE INVENTION

1. Field of the Invention

The present invention relates to a post hole digger. In particular, the present invention relates to a post hole digger for digging holes of approximately constant diameter.

2. Discussion of Background

Many types of post hole diggers are known. Auger-type diggers are provided with a screw that is advanced into the ground, such as the motorized auger shown by Ovens (U.S. Pat. No. 4,961,471). Alternatively, a boring implement can be secured to an end of a post to be inserted into the ground. The post is rotated and advanced to the desired depth, such as by directing a stream of water in the direction of the piercing end to cause rotation of the post (Charland, et al., U.S. Pat. No. 4,986,373). The implement is left in the ground after the post has been positioned. These types of post hole diggers are satisfactory for use in soft earth, but are difficult to use in hard or rocky soil. Augers may be stalled completely by rocks. In addition, applications such as park or highway maintenance require digging a single hole or a small number of holes at one location. Motorized equipment is impractical for on-the-spot maintenance and small-scale operations where only a few holes are needed, and water may not be available at all locations.

Manual post hole diggers are perhaps the most common type being sold today. The familiar "clamshell" digger consists of four main parts: two long pole-handles and two clamshell digging cups connected to the handles. The handles are moved together to separate the cups, and apart to bring the cups together. Digging is accomplished by plunging the digger into the ground with the handles together, followed by spreading the handles apart to force the cups together to grip a quantity of soil. The digger is pulled out, handles still held apart, and the load is then dumped off to the side. The process is repeated until the hole is the desired depth.

Any homeowner is familiar with this type of digger and its principal problem: as the hole is dug deeper, the handles cannot be spread apart sufficiently far to grip the soil unless the diameter of the top of the hole is made progressively larger—otherwise, the handles will bind with the top edge of the hole. This type of digger requires time and effort for the removal of additional soil, and provides a less firm foundation for a post set into the hole when the loosened soil is used as fill.

Many constant-hole-diameter post hole diggers have been developed in attempts to solve this problem. Some designs have scissors-type connections between the two poles to allow digging deeper holes before the hole needs to be enlarged (Stormsgaard, Des. No. 311,853; Weiland, U.S. Pat. No. 4,042,270). Most constant-hole-diameter diggers have a pair of opposing clamshell-type digging blades pivotally mounted at the lower end of a shaft. A pull rod inside the shaft opens and closes the blades. Such diggers are provided by Rice (U.S. Pat. Nos. 2,712,467; 2,654,626), Arens (U.S. Pat. No. 2,710,765), Sonnenberg (U.S. Pat. No. 2,435,473), Loos, et al. (U.S. Pat. No. 2,230,498), Mayeda, et al. (U.S. Pat. No. 2,028,680), McDowell (U.S. Pat. No. 1,888,929) and Theriot (U.S. Pat. No. 1,706,332). These devices are complex and expensive to make, and awkward to use. None of the devices can be extended in length for digging deeper holes.

There is a need for a constant-hole-diameter post hole digger that is simple and inexpensive to make, reliable, and simple to use.

SUMMARY OF THE INVENTION

According to its major aspects and broadly stated, the present invention is a post hole digger having a bracket plate, a center shaft and two side shafts, each shaft with a first end and a second end. The first end of the center shaft is mounted to the bracket plate. To the second end of the center shaft is pivotally mounted a pair of digging blades, with one blade also pivotally attached to the second end of each side shaft. A handle is pivotally attached to the bracket plate and to the first end of each side shaft. As the handles are rotated with respect to one another, the side shafts move axially with respect to the center shaft to open and close the digging blades. The shafts are maintained in approximately parallel, spaced relation to one another during operation of the digger so that the hole has an approximately constant diameter. A detent mechanism is provided for indicating when the digging blades are oriented approximately parallel to one another for insertion into the ground. Extension rods increase the operating length of the shafts to allow digging deeper holes.

The relationship of the side shafts and the center shaft constitutes an important feature of the present invention. The relative movement of the side shafts with respect to the center shaft opens and closes the digging blades, with the side shafts being extended with respect to the center shaft to close the blades and retracted to open the blades. Unlike the other post hole diggers described above, where a center shaft encloses a shaft that operates the blades, the present invention moves control of the blades to outside shafts. This arrangement simplifies construction and reduces the cost of the digger. Also, in this configuration, the shafts can be lengthened by extension rods if needed for digging deeper holes.

Another feature of the invention is the combination of the detent and the keeper. The detent is biased to the center of the keeper and provides an audible "click" when it moves into the indentation of the keeper and a tactile indication, because of the slight force needed to move it out of the biased position in either direction, that the blades are in line with the side shafts.

Still another feature of the invention is the movement of the handles to operate the digging blades. The operator moves the handles together to close the blades and apart to open the blades, rather than together to separate the blades and apart to bring the blades together as in the conventional clamshell digger. Lifting the present digger while pushing the hands together is easier than lifting while pulling the handles apart, as in the conventional digger.

Another feature of the invention is the combination of the handles and the bracket plate. The handles are pivotally attached to the bracket plate on either side of the center shaft and the side shafts are pivotally attached to the handles. The bracket plate helps to maintain the center shaft and the side shafts in spaced relation to one another during operation of the digger; thus, the digger has a compact profile for insertion into the ground and digging a hole with approximately constant diameter.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1a is a front view of a post hole digger according to a preferred embodiment of the present invention;

FIG. 1b is a side view of the digger of FIG. 1a;

FIG. 2a is a front view of a post hole digger according to an alternative preferred embodiment of the present invention; and FIG. 2b is a side view of the digger of FIG. 2a.

DETAILED DESCRIPTION OF A PREFERRED EMBODIMENT

Referring now to FIG. 1a, there is shown a post hole digger 10 according to a preferred embodiment of the present invention. Digger 10 has a bracket plate or support plate 12, a center shaft 14, a first side shaft 16 and a second side shaft 16'. Center shaft 14 has a first end 20 and a second end 22; side shafts 16, 16' have first ends 24, 24' and second ends 26, 26', respectively. First end 20 of shaft 14 is attached to bracket plate 12 by a bolt, pin, or other fastening means 28.

Two brackets 30, 30' have first ends 32, 32', second ends 34, 34', and center portions 36, 36', respectively. First ends 32, 32' are pivotally attached to bracket plate 12 by swivel pins 40, 40', and second ends 34, 34' hold handles 42, 42'. Center portions 36, 36' are attached to first ends 24, 24', respectively, of side shafts 16, 16' by bolts or pins 44, 44'. Handles 42, 42' have inner portions 46, 46' and outer portions 48, 48', respectively. While brackets 30, 30' are illustrated as being generally "L"-type brackets, it will be understood that brackets 30, 30' may be of any convenient shape.

A pair of opposing digging blades 50, 50' are pivotally attached to second ends 26, 26' of side shafts 16, 16' by pins 52, 52', respectively. Blades 50, 50' are also pivotally attached to second end 22 of center shaft 14 by pin 54, generally as shown in FIGS. 1a and 1b. Blades 50, 50' may be the familiar type of clamshell cups, or any other suitable shovel-, spoon- or spade-shaped blades adapted for digging holes. If desired, blades 50, 50' may be provided with sharpened or serrated edges to facilitate insertion into the ground. As will be explained below, rotation of handles 42, 42' with respect to one another rotates side shafts 16, 16' with respect to center shaft 14 to open and close blades 50, 50'.

Rotation of handles 42, 42' about pivot pins 40, 40' causes pins 44, 44' to rotate about pins 40, 40' at a radius equal to the spacing of the pins on brackets 30, 30'. Thus, when handle 42' is rotated counterclockwise about pivot pin 40' towards handle 42, pin 44' moves downwards, causing shaft 16' to move downwards. Similarly, when handle 42 is rotated clockwise towards handle 42', pin 44 moves downwards along with shaft 16. Counterclockwise rotation of handle 42 and clockwise rotation of handle 42' cause pins 44, 44' and shafts 16, 16' to move upwards.

Since center shaft 14 is anchored to bracket plate 12, side shafts 16, 16' move axially with respect to shaft 14 as handles 42, 42' are rotated with respect to one another. When handles 42, 42' are moved together, shaft 16 is extended with respect to bracket plate 12 and center shaft 14, and blade 50 pivots on pins 52 and 54, rotating counterclockwise with its tip 58 moving towards the tip 58' of blade 50'. Similarly, shaft 16' is extended with respect to shaft 14 and bracket plate 12, and blade 50' rotates clockwise with tip 58' moving towards tip 58. Retraction of shafts 16, 16'—by moving handles 42, 42' apart—opens the blades by rotating blade 50 clockwise and blade 50' counterclockwise to separate tips 58, 58'.

To use digger 10, the operator grasps inner portions 46, 46' of handles 42, 42', and rotates the handles until digging blades 50, 50' are axially aligned with side shafts 16, 16' in a first open position A (see FIG. 1a). When in position A, inner portions 46, 46' are approximately parallel and blades 50, 50' are open and approximately parallel to one another, ready for insertion into the ground. The operator positions digger 10 over the desired site and inserts blades 50, 50' into the ground.

To grasp a load of soil for removal, the operator holds outer portions 48, 48' of handles 42, 42', forcing handles 42, 42' to rotate on pivot pins 40, 40'. The inward rotation of handles 42, 42' causes outer shafts 16, 16' to move downwards with respect to center shaft 14, so digging blades 50, 50' pivot on pins 52, 52' and 54 to a closed position for holding a load of soil. When closed, digging blades 50, 50' form a closed scoop as indicated by position B in FIG. 1a.

The operator lifts digger 10 out of the ground while holding handles 42, 42' at upper portions 48, 48'. As long as the operator continues to lift at upper portions 48, 48', digging blades 50, 50' remain closed about the load and no additional mechanism is required to hold the load during lifting. The handles—and the operator's hands—are held close together while moving a load of dirt.

Once digger 10 has been removed from the hole, the operator positions digger 10 at a dump site and rotates handles 42, 42' outwards to a second open position to release the load, approximately position C as indicated in FIG. 1a. Handles 42, 42' pivot outwards on pins 40, 40', retracting side shafts 16, 16' and rotating digging blades 50, 50' outwards on pivot pins 52, 52' and 54, opening the blades and releasing the load. The operator returns digger 10 to position A, and repeats the operation until the hole is of the desired depth. Since side shafts 16, 16' are maintained in spaced relation to center shaft 14 during operation-preferably approximately parallel to center shaft 14—the hole is of approximately constant diameter.

If desired, a detent plate 60 may be attached to side shafts 16, 16' by bolts, pins or other suitable fasteners 62, 62'. Plate 60 is spaced apart from center shaft 14, as best seen in FIG. 1b. A detent pin 64 is mounted to plate 60, and a keeper 66 is attached to center shaft 14. Keeper 66 is positioned so that, as plate 60 moves axially with respect to center shaft 14, carried by side shafts 16, 16', pin 64 engages keeper 66 just at the point where digging blades 50, 50' are axially aligned with respect to the shafts. Thus, keeper 66 may be a metal strip with an indentation 68 sized to accept pin 64, or some other type of keeper that urges pin 64 into indentation 68 with an audible "click" and a slight resistance felt in handles 42, 42' in moving them from the position they are in when pin 64 is in indentation 68. Detent plate 60, pin 64 and keeper 66 provide tactile feedback to the operator of digger 10, allowing the operator to sense when digging blades 50, 50' are properly aligned for insertion into the ground. When blades 50, 50' are axially aligned with shafts 16, 16', approximately parallel to one another as indicated by position "A" in FIG. 1a, digger 10 is in an open position and ready for insertion into the ground.

If desired, digger 10 may be lengthened for use in making deeper holes. As shown in FIGS. 2a and 2b, center shaft 14 may be formed in two sections, an upper section 70 having a first end 20 and a second end 72, and a lower section 74 with a first end 76 and a second end 22. Similarly, side shafts 16, 16' have upper sections 80, 80' with first ends 24, 24' and second ends 82, 82', and lower sections 84, 84' with first ends 86, 86' and second ends 26, 26', respectively.

An extension rod 90 is attached to upper section 70 and lower section 74 of center shaft 14. Rod 90 is clamped to second end 72 of upper section 70 by clamps 92, and to first end 76 of lower section 74 by clamps 94. Similarly, extension rods 96, 96' are attached to upper sections 80, 80' and lower sections 84, 84' of side shafts 16, 16'. Rods 96, 96' are clamped to second ends 82, 82' of upper sections 80, 80' by clamps 98, 98', and to first ends 86, 86' of lower sections 84, 84' by clamps 100, 100', respectively. Clamps 92, 94, 98, 98', 100, 100' are preferably "U" clamps such as are known in the art, or other suitable clamps for adjustably attaching extension rods 90, 96, 96' to shafts 14, 16, 16', respectively.

As best seen in FIG. 2b, extension rods 90, 96, 96' are offset from bracket plate 12. Thus, a suitable length of rod 90 is positioned between upper section 70 and lower section 74 of center shaft 14. Similarly, a suitable length of rods 96, 96' is positioned between the upper sections 80, 80' and lower sections 84, 84' of shafts 16, 16', respectively. The excess length of rods 90, 96, 96' extends past bracket plate 12 above digger 10 without the operator's fingers touching the rods during use of digger 10. As the hole is dug deeper, clamps 92, 98, 98', 100, 100' may be loosened to allow repositioning of rods 90, 96, 96'.

As the hole becomes deeper and the operating length of digger 10 become longer, a point is reached where the operator can no longer comfortably lift digger 10 out of the hole and retain the load in digging blades 50, 50' by holding handles 42, 42' together. At this point, the operator may temporarily fasten the handles in their most inward position. This may be done, for example, by wrapping a belt or strap around the handles. Suitable materials for use with the present invention include hook-and-loop type fasteners such as VELCRO TM strap. After closing handles 42, 42' and loading blades 50, 50' with dirt, the operator wraps the strap about the handles, locking the handles together. After raising the digger, the operator removes the tape, opens handles 42, 42' and dumps the load. Thus, the only limitation to the depth of hole that can be dug with digger 10 is the strength of the operator to raise and lower the digger.

Digger 10 is made of any materials that are suitable for outdoor use, preferably durable, substantially non-corroding and lightweight materials such as aluminum, stainless steel, fiberglass and composite materials. Side shafts 16, 16' and extension rods 96, 96' are preferably made of a resilient, flexible material, such as hollow piping. As digging blades 50, 50' rotate about pin 54, the spacing between pins 26 and 26' varies. Similarly, the spacing between pins 44 and 44' varies as handles 42, 42' rotate about pins 40, 40'. This variation in spacing between pins 26 and 26', and between pins 44 and 44', is accommodated by the inherent flexibility of outer shafts 16, 16'—and extension rods 96, 96' if used—rather than providing toggle links or other means for varying the spacing to accommodate the movement of the shafts.

Shafts 16, 16' are therefore made of a material that is elastically deformable within the limits of operability of digger 10, such as type EMC galvanized piping or similar material. Thus, a digger according to the present invention is simple and inexpensive to make from durable, readily available materials.

It will be apparent to those skilled in the art that many changes and substitutions can be made to the preferred embodiment herein described without departing from the spirit and scope of the present invention as defined by the appended claims.

What is claimed is:

1. A post hole digger, comprising:
    a center shaft having a first end and a second end;
    a pair of side shafts, each of said side shafts having a first end and a second end;
    a pair of digging blades pivotally attached to said second end of said center shaft, each digging blade of said pair of blades pivotally attached to said second end of one of said side shafts, said digging blades rotatable between an open position wherein said digging blades are axially aligned with respect to said side shafts and a closed position wherein said digging blades have pivoted together; and
    a pair of handles pivotally attached to said first end of said center shaft, each handle of said pair of handles pivotally attached to said first end of one of said side shafts, said pair of handles pivoting said digging blades to said closed position as said pair of handles are moved together and to said open position as said handles are moved away from one another, said side shafts moving axially with respect to said center shaft between said open and said closed positions.

2. The post hole digger as recited in claim 1, wherein said operating means further comprises means for maintaining said center shaft and said side shafts in spaced relation with respect to each other.

3. The post hole digger as recited in claim 1, further comprising
    a support plate mounted to said first end of said center shaft, said pair of handles being pivotally attached to said support plate.

4. The post hole digger as recited in claim 1, further comprising means for indicating when said digging blades are axially aligned with respect to said side shafts.

5. The post hole digger as recited in claim 1, wherein said center shaft and said side shafts each further comprise:
    an upper section;
    a lower section separated from said upper section by a distance; and
    an intermediate section having a first end and a second end, said first end of said intermediate section releasably attached to said upper section and said second end of said intermediate section releasably attached to said lower section so that said distance can be changed.

6. The post hole digger as recited in claim 1, wherein said side shafts are made of an elastically deformable material.

7. A post hole digger, comprising:
    a center shaft having a first end, a second end, a first side and a second side;
    a first side shaft in spaced relation to said first side of said center shaft;

a second side shaft in spaced relation to said second side of said center shaft, each of said side shafts having a first end and a second end;

a pair of opposing digging blades pivotally attached to said second end of said center shaft, a digging blade of said pair of blades pivotally attached to said second end of each of said side shafts, said digging blades rotatable between an open position wherein said digging blades are axially aligned with respect to said side shafts and a closed position wherein said digging blades move together to form a substantially closed scoop;

a pair of handles, a handle of said pair of handles pivotally attached to said first end of each of said side shafts; and means connected to said center shaft and said side shafts for effecting opening and closing of said digging blades, said effecting means moving said digging blades to said closed position as said handles are moved towards one another and moving said digging blades to said open position as said handles are moved away from one another, said effecting means moving said side shafts axially with respect to said center shaft to move said digging blades between said open and closed positions.

8. The post hole digger as recited in claim 7, wherein said effecting means further comprises means for maintaining said center shaft in spaced relation to said side shafts.

9. The post hole digger as recited in claim 7, wherein said effecting means further comprises a support plate mounted to said first end of said center shaft, said handles being pivotally attached to said support plate.

10. The post hole digger as recited in claim 7, further comprising means for indicating when said digging blades are axially aligned with respect to said side shafts.

11. The post hole digger as recited in claim 7, further comprising:
a detent plate having a first side and a second side, said first side attached to said first side shaft and said second side attached to said second side shaft;
a detent attached to said detent plate; and
a keeper attached to said center shaft and having an indentation, said detent biased by said keeper toward said indentation, said side shafts being axially aligned when said detent is in said indentation.

12. The post hole digger as recited in claim 7, wherein said side shafts are made of an elastically deformable material.

13. The post hole digger as recited in claim 7, wherein said center shaft and said side shafts each further comprise:
an upper section;
a lower section separated from said upper section by a distance; and
an intermediate section having a first end and a second end, said first end of said intermediate section releasably attached to said upper section and said second end of said intermediate section releasably attached to said lower section so that said distance can be changed.

14. A post hole digger, comprising:
a center shaft having a first end, a second end, a first side and a second side;
a support plate mounted to said first end of said center shaft;
a first side shaft in spaced relation to said first side of said center shaft;
a second side shaft in spaced relation to said second side of said center shaft, each of said side shafts having a first end and a second end;
a pair of opposing digging blades, said digging blades pivotally attached to said second end of said center shaft, a digging blade of said pair of blades pivotally attached to said second end of each of said side shafts, said digging blades rotatable between an open position wherein said digging blades are axially aligned with respect to said side shafts and a closed position wherein said digging blades form a substantially closed scoop;
a pair of handles pivotally attached to said support plate, a handle of said pair of handles pivotally attached to said first end of each of said side shafts, said handles closing said digging blades as said handles are moved towards one another and opening said digging blades as said handles are moved away from one another, said side shafts being extended with respect to said center shaft as said digging blades are closed and retracted with respect to said center shaft as said digging blades are opened.

15. The post hole digger as recited in claim 14, further comprising means for indicating when said digging blades are axially aligned with respect to said side shafts.

16. The post hole digger as recited in claim 14, further comprising:
a detent plate having a first side and a second side, said first side attached to said first side shaft and said second side attached to said second side shaft;
a detent attached to said detent plate; and
a keeper attached to said center shaft, said keeper positioned to engage said detent when said digging blades are axially aligned with respect to said side shafts.

17. The post hole digger as recited in claim 14, wherein said side shafts are made of an elastically deformable material.

18. The post hole digger as recited in claim 14, wherein said shafts are made of a resilient material.

19. The post hole digger as recited in claim 14, wherein said center shaft and said side shafts each further comprise:
an upper section;
a lower section separated from said upper section by a distance; and
an intermediate section having a first end and a second end, said first end of said intermediate section releasably attached to said upper section and said second end of said intermediate section releasably attached to said lower section so that said distance can be changed.

* * * * *